United States Patent
Stamey, Jr. et al.

(10) Patent No.: US 10,625,184 B2
(45) Date of Patent: Apr. 21, 2020

(54) COALESCING FILTER ELEMENT

(71) Applicant: Wix Filtration Corp LLC, Gastonia, NC (US)

(72) Inventors: Willie L. Stamey, Jr., Kings Mountain, NC (US); Mark A. Roll, Bessemer City, NC (US); Gregory K. Rhyne, Stanely, NC (US)

(73) Assignee: MANN+HUMMEL Filtration Technology Group Inc., Gastonia, NC (US)

( * ) Notice: Subject to any disclaimer, the term of this patent is extended or adjusted under 35 U.S.C. 154(b) by 522 days.

(21) Appl. No.: 14/931,473

(22) Filed: Nov. 3, 2015

(65) Prior Publication Data

US 2017/0120168 A1    May 4, 2017

(51) Int. Cl.
*B01D 29/15*   (2006.01)
*B01D 36/00*   (2006.01)
(Continued)

(52) U.S. Cl.
CPC ............. *B01D 29/15* (2013.01); *B01D 29/21* (2013.01); *B01D 35/005* (2013.01);
(Continued)

(58) Field of Classification Search
CPC ...... B01D 29/15; B01D 29/21; B01D 36/006; B01D 36/005; B01D 35/005;
(Continued)

(56) References Cited

U.S. PATENT DOCUMENTS

| 3,931,011 A | 1/1976 | Richards et al. |
| 4,565,629 A | 1/1986 | Wilson et al. |

(Continued)

FOREIGN PATENT DOCUMENTS

| CN | 103089504 A | 5/2013 | |
| JP | 2013096368 A * | 5/2013 | ........... B01D 36/003 |

(Continued)

OTHER PUBLICATIONS

Japanese Office Action for the related application No. 2016-215967 dated Nov. 27, 2017 with its English translation thereof.
(Continued)

*Primary Examiner* — Krishnan S Menon
*Assistant Examiner* — Waqaas Ali
(74) *Attorney, Agent, or Firm* — Honigman LLP

(57) ABSTRACT

One aspect of the disclosure provides a filter element including a first end cap, a second end cap, a ring of filter media and an annular seal. The first end cap defines a cylindrical collar that circumscribes a first central opening and includes a substantially planar first outer surface that extends radially outward from the cylindrical collar to an outer peripheral edge. The second end cap defines a second central opening substantially coaxial with the first central opening. The ring of filter media is disposed between the first end cap and the second end cap, and circumscribes a central cavity in fluid communication with the first central opening and the second central opening. The annular seal is disposed upon the first outer surface of the first end cap and around the cylindrical collar. The annular seal extends axially way from the first outer surface.

18 Claims, 5 Drawing Sheets

(51) Int. Cl.
  *B01D 29/21* (2006.01)
  *B01D 35/00* (2006.01)

(52) U.S. Cl.
  CPC ......... *B01D 36/005* (2013.01); *B01D 36/006* (2013.01); *B01D 2201/0415* (2013.01); *B01D 2201/295* (2013.01); *B01D 2201/301* (2013.01); *B01D 2201/342* (2013.01); *B01D 2201/347* (2013.01)

(58) Field of Classification Search
  CPC ........ B01D 2201/301; B01D 2201/342; B01D 2201/295; B01D 2201/347; B01D 2201/0415
  See application file for complete search history.

(56) References Cited

U.S. PATENT DOCUMENTS

| | | | |
|---|---|---|---|
| 4,588,500 | A | 5/1986 | Sprenger et al. |
| 4,619,764 | A | 10/1986 | Church et al. |
| 5,171,430 | A * | 12/1992 | Beach .................. B01D 35/30 210/440 |
| 5,215,660 | A | 6/1993 | Mosher et al. |
| 5,458,767 | A | 10/1995 | Stone |
| 5,622,623 | A | 4/1997 | Stone |
| 5,997,739 | A | 12/1999 | Clausen et al. |
| 6,187,073 | B1 | 2/2001 | Gieseke et al. |
| 6,368,386 | B1 | 4/2002 | Nelson et al. |
| 6,572,762 | B2 | 6/2003 | Maxwell et al. |
| 7,081,145 | B2 | 7/2006 | Gieseke et al. |
| 7,086,537 | B2 | 8/2006 | Maxwell et al. |
| 7,182,894 | B2 | 2/2007 | Kumar et al. |
| 7,338,544 | B2 | 3/2008 | Sporre et al. |
| 7,438,812 | B2 | 10/2008 | Denton et al. |
| 7,614,504 | B2 | 11/2009 | South et al. |
| 7,648,565 | B2 | 1/2010 | Clausen et al. |
| 7,674,376 | B1 | 3/2010 | Herman et al. |
| 7,882,961 | B2 | 2/2011 | Menez et al. |
| 7,935,255 | B2 | 5/2011 | Jiang |
| 7,967,887 | B1 | 6/2011 | Yonushonis et al. |
| 7,980,233 | B2 | 7/2011 | Wagner et al. |
| 8,034,240 | B2 | 10/2011 | Reiland et al. |
| 8,096,423 | B2 | 1/2012 | Menez et al. |
| 8,097,061 | B2 | 1/2012 | Smith et al. |
| 8,167,966 | B2 | 5/2012 | Amirkhanian et al. |
| 8,277,655 | B2 | 10/2012 | Wieczorek |
| 8,333,890 | B2 | 12/2012 | Wells et al. |
| 8,349,061 | B2 | 1/2013 | Scheckel et al. |
| 8,361,181 | B2 | 1/2013 | Osendorf et al. |
| 8,440,083 | B2 | 5/2013 | Jiang et al. |
| 8,499,749 | B2 | 8/2013 | Mosset et al. |
| 8,540,080 | B2 | 9/2013 | Salvador et al. |
| 8,551,335 | B2 | 10/2013 | Wieczorek et al. |
| 8,608,863 | B2 | 12/2013 | Stremel, III |
| 8,678,292 | B2 | 3/2014 | Tsai et al. |
| 8,714,142 | B2 | 5/2014 | Jacob et al. |
| 8,741,138 | B2 | 6/2014 | Oelschlaegel |
| 8,852,310 | B2 | 10/2014 | Holzmann et al. |
| 8,877,057 | B2 | 11/2014 | Wessels et al. |
| 8,932,465 | B2 | 1/2015 | Wells et al. |
| 8,974,567 | B2 | 3/2015 | Verdegan et al. |
| 2003/0146149 | A1 | 8/2003 | Binder et al. |
| 2007/0095744 | A1 | 5/2007 | Bagci et al. |
| 2008/0047891 | A1 | 2/2008 | Roesgen |
| 2008/0190839 | A1 * | 8/2008 | Girondi .................. B01D 29/21 210/433.1 |
| 2009/0020465 | A1 | 1/2009 | Jiang et al. |
| 2009/0065419 | A1 | 3/2009 | Jiang |
| 2009/0065425 | A1 | 3/2009 | Jiang |
| 2010/0064646 | A1 | 3/2010 | Smith et al. |
| 2011/0017657 | A1 | 1/2011 | Jokschas et al. |
| 2011/0089104 | A1 | 4/2011 | Menez et al. |
| 2012/0055127 | A1 | 3/2012 | Holzmann et al. |
| 2017/0218894 | A1 * | 8/2017 | Girondi .................. F02B 33/40 |

FOREIGN PATENT DOCUMENTS

| | | |
|---|---|---|
| JP | 2015081521 A | 4/2015 |
| WO | WO-0172396 A1 | 10/2001 |
| WO | WO-2010020514 A1 | 2/2010 |
| WO | 2015140626 A1 | 9/2015 |

OTHER PUBLICATIONS

Canadian Office Action for the related application No. 2,947,289 dated Dec. 20, 2017.

* cited by examiner

COALESCING FILTER ELEMENT

TECHNICAL FIELD

This disclosure relates to fuel filter assemblies, and more particularly to a filter element of a filter assembly having a filter media for separating water and removing particulates within a fuel stream passing through the filter media.

BACKGROUND

Filter assemblies may be used in fuel systems to remove particulates within a fuel stream between a fuel tank and an engine and/or other components. For example, a pump may move the fuel through the system from the fuel tank to the engine. The filter assembly may include a filter cartridge disposed downstream of the pump to remove the particulates from the fuel prior to delivery to the engine and/or other downstream components. The filter cartridge may also be configured to separate out fluids, such as water, from the fuel that may create erratic fuel delivery, thereby effecting performance of the downstream components.

It is known, to use filter cartridges having one filter element that has media to first coalesce fluid from the fuel, and another filter element that has media to further filter the fuel. For instance, the filter element used for coalescing the fluid may include a coarse media, while the other filter element used for removing particulates within the fuel may include a more fine media. Conventionally, these filter elements are concentrically arranged such that the coalescing media surrounds the filter media and a space is defined between the two medias to allow the coalesced fluid to drain out of the filter cartridge. While conventional filter cartridges using two filter elements in this manner may be effective for separating fluid (e.g., water) and particulates from fuel, arranging the two filter medias in this manner complicates the ability to easily assemble such filter cartridges.

SUMMARY

One aspect of the disclosure provides a filter element including a first end cap, a second end cap, a ring of filter media and an annular seal. The first end cap defines a cylindrical collar that circumscribes a first central opening and includes a substantially planar first outer surface that extends radially outward from the cylindrical collar to an outer peripheral edge. The second end cap defines a second central opening substantially coaxial with the first central opening. The ring of filter media is disposed between the first end cap and the second end cap, and circumscribes a central cavity in fluid communication with the first central opening and the second central opening. The annular seal is disposed upon the first outer surface of the first end cap and around the cylindrical collar. The annular seal extends axially way from the first outer surface.

Implementations of the disclosure may include one or more of the following optional features. In some implementations, the cylindrical collar includes a first portion that extends axially outward from the first end cap and a second portion that extends axially inward from the first end cap and into the central cavity. An axial length of the annular seal is less than an axial length of the first portion of the cylindrical collar.

In some configurations, the filter element also includes a plurality of tabs circumferentially arranged around the outer peripheral edge of the first end cap. In these configurations, each tab extends only in a radially outward direction away from the outer peripheral edge of the first end cap. The plurality of tabs may define a plurality of unfiltered fuel spaces. For example, each unfiltered fuel space may be defined between an adjacent pair of the tabs and is configured to direct unfiltered fuel flowing onto the first outer surface of the first end cap to an outer periphery of the filter media for filtering.

In some implementations, the second end cap includes an annular flange extending axially outward from second end cap and configured to receive an outer seal at an outer surface of the annular flange. In some examples, the outer surface of the annular flange includes a circumferential sealing groove formed therethrough that retains the outer seal. The filter media may be configured to separate both water and particulates from unfiltered fuel as the unfiltered fuel flows radially inward through the filter media. Here, the water separated by the filter media drains out of the filter element through the second central opening of the second end cap while fuel filtered by the filter media flows out of the filter element through the first central opening of the first end cap. Optionally, the filter element may include a support core disposed in the central cavity that supports an inner periphery of the filter media, wherein the cylindrical collar is disposed radially inward from the support core.

Another aspect of the disclosure provides a filter assembly including a filter housing and a filter element. The filter housing defines an internal chamber between a first end and a second end and the filter element is disposed within the internal chamber of the filter housing. The filter element includes a first end cap opposing the first end of the filter housing, a second end cap opposing the second end of the filter housing, and a ring of filter media axially extending between the first end cap and the second end cap. The first end cap includes a cylindrical collar circumscribing a first central opening and a substantially planar first outer surface extending radially outward from the cylindrical collar to an outer peripheral edge of the first end cap. The second end cap defines a second central opening substantially coaxial with the first central opening. The ring of filter media circumscribes a central cavity in fluid communication with the first central opening and the second central opening. The filter element also includes an annular seal disposed upon the first outer surface of the first end cap and around the cylindrical collar. the annular seal extends axially away from the first outer surface.

This aspect may include one or more of the following optional features. Optionally, the housing includes a cylindrical sleeve extending away from the first end of the housing and into contact with the annular seal and receiving the cylindrical collar to form a fuel outlet passage in fluid communication with the central cavity to direct fuel filtered by the filter media out of the filter element. In some examples, the annular seal provides a fluid tight seal between the cylindrical collar and the cylindrical sleeve to fluidly separate the outer surface of the first end cap from the central cavity and fuel outlet passage. In some implementations, the annular seal is at least one of radially compressed between the cylindrical collar and the cylindrical sleeve or axially compressed between the cylindrical sleeve and the first end cap.

In some examples, the filter assembly also includes a plurality of tabs circumferentially arranged around the outer peripheral edge of the first end cap and extending only in a radially outward direction away from the outer peripheral edge of the first end cap. In these examples, each tab is configured to engage a circumferential ledge of the housing within the internal chamber. In some configurations, each adjacent pair of the tabs define an associated unfiltered fuel space configured to direct unfiltered fuel flowing onto the first outer surface of the first end cap to an outer periphery of the filter media for filtering.

In some configurations, the second end cap includes an annular flange that extends axially away from the second end cap and toward the second end of the filter housing. In these configurations, the annular flange has an outer surface configured to retain an outer seal. The outer seal may engage an interior wall of the housing to provide a fluid tight seal between a reservoir defined by the housing at the second end and unfiltered fuel flowing within the internal chamber between an outer periphery of the filter media and the interior wall of the housing. Here, the reservoir may be in fluid communication with the second central opening of the second end cap. In some examples, the unfiltered fuel passes through the filter media at the outer periphery and exits an inner periphery of the filter media as filtered fuel and water droplets coalesced from the filtered fuel by the filter media. In these examples, the fluid droplets drain out of the filter media through the second central opening of the second end cap and the filtered fuel flows out of the filter element through the first central opening of the first end cap.

Yet another aspect of the disclosure provides a method of manufacturing a filter element. The method includes integrally forming a first end cap with a cylindrical collar that circumscribes a first central opening formed through the first end cap, providing a second end cap defining a second central opening, and providing a ring of filter media circumscribing a central cavity and extending axially between a first end and a second end. The first end cap includes a substantially planar first outer surface extending radially outward from the cylindrical collar to a first peripheral edge and the second end cap includes a second outer surface extending radially outward from the second central opening to a second peripheral edge. The method also includes affixing one of the first end cap to the first end of the filter media or the second end cap to the second end of the filter media, and affixing the other one of the first end cap to the first end of the filter media or the second end cap to the second end of the filter media. The method also includes positioning an annular seal upon the substantially planar first outer surface of the first end cap and in opposed contact with an outer peripheral surface of the cylindrical collar. The annular seal defines an axial length less than an axial length of the cylindrical collar.

In some examples, the method also includes positioning an outer seal within a circumferential groove integrally formed in an inner annular flange that extends axially away from the second outer surface of the second end cap. In these examples, the outer seal includes an exposed portion that extends radially outward from the inner annular flange.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
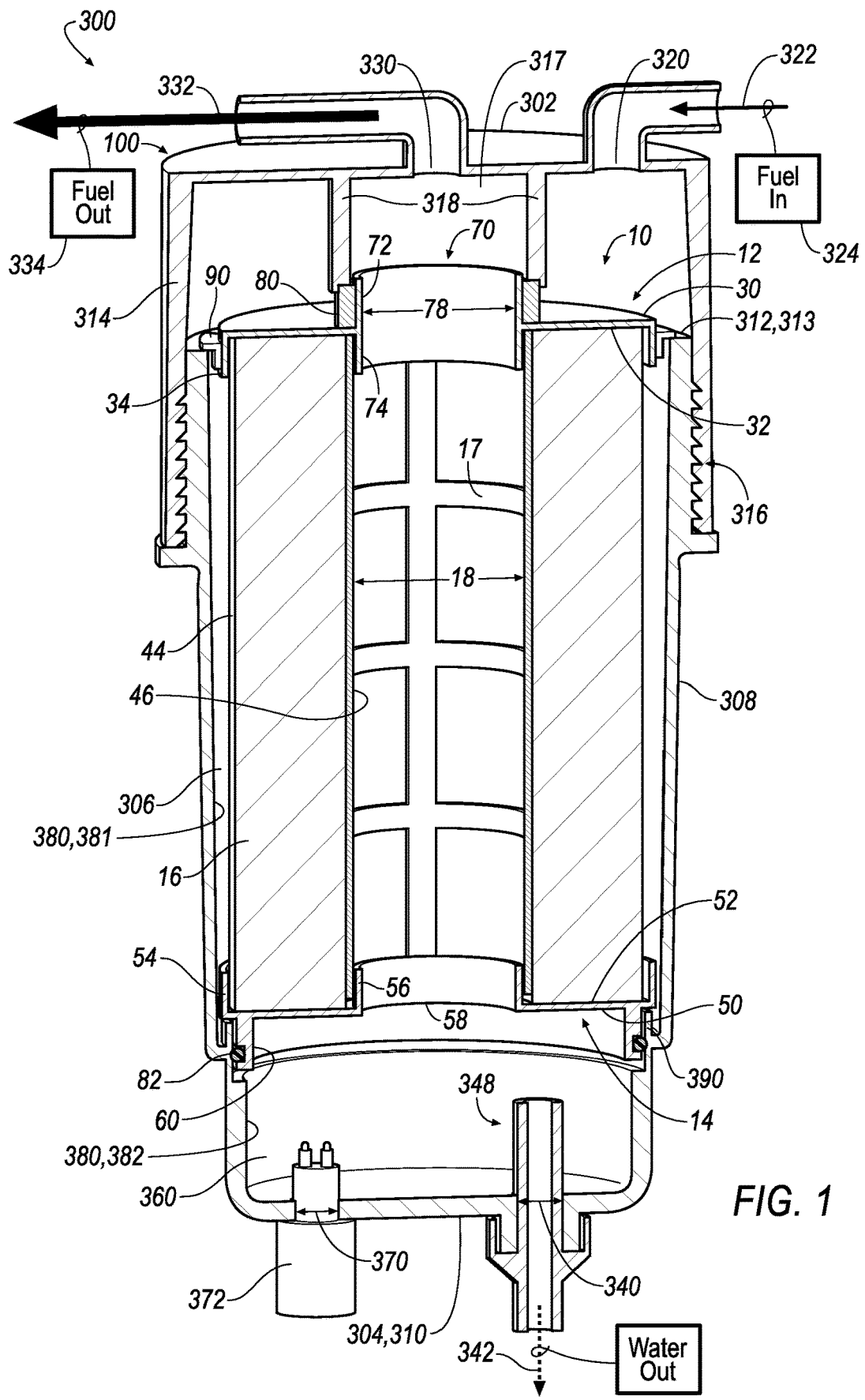
FIG. 1 is a perspective cross-sectional view of a filter assembly including a filter housing and a filter element disposed within the filter housing and including an annular seal disposed around a cylindrical collar projecting from a top end cap.
Figure 2:
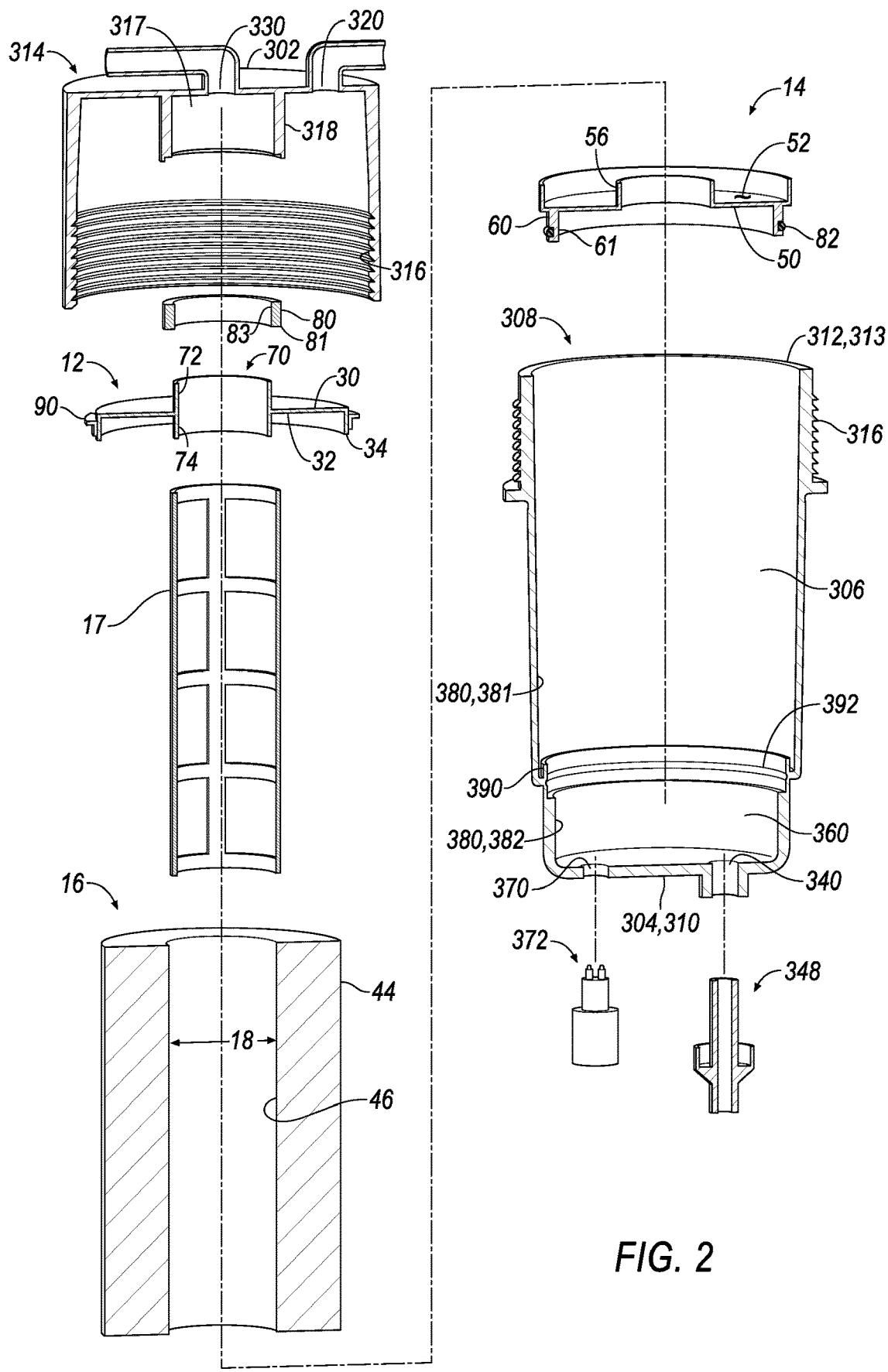
FIG. 2 is an exploded view of the filter assembly of FIG. 1.
Figure 3:
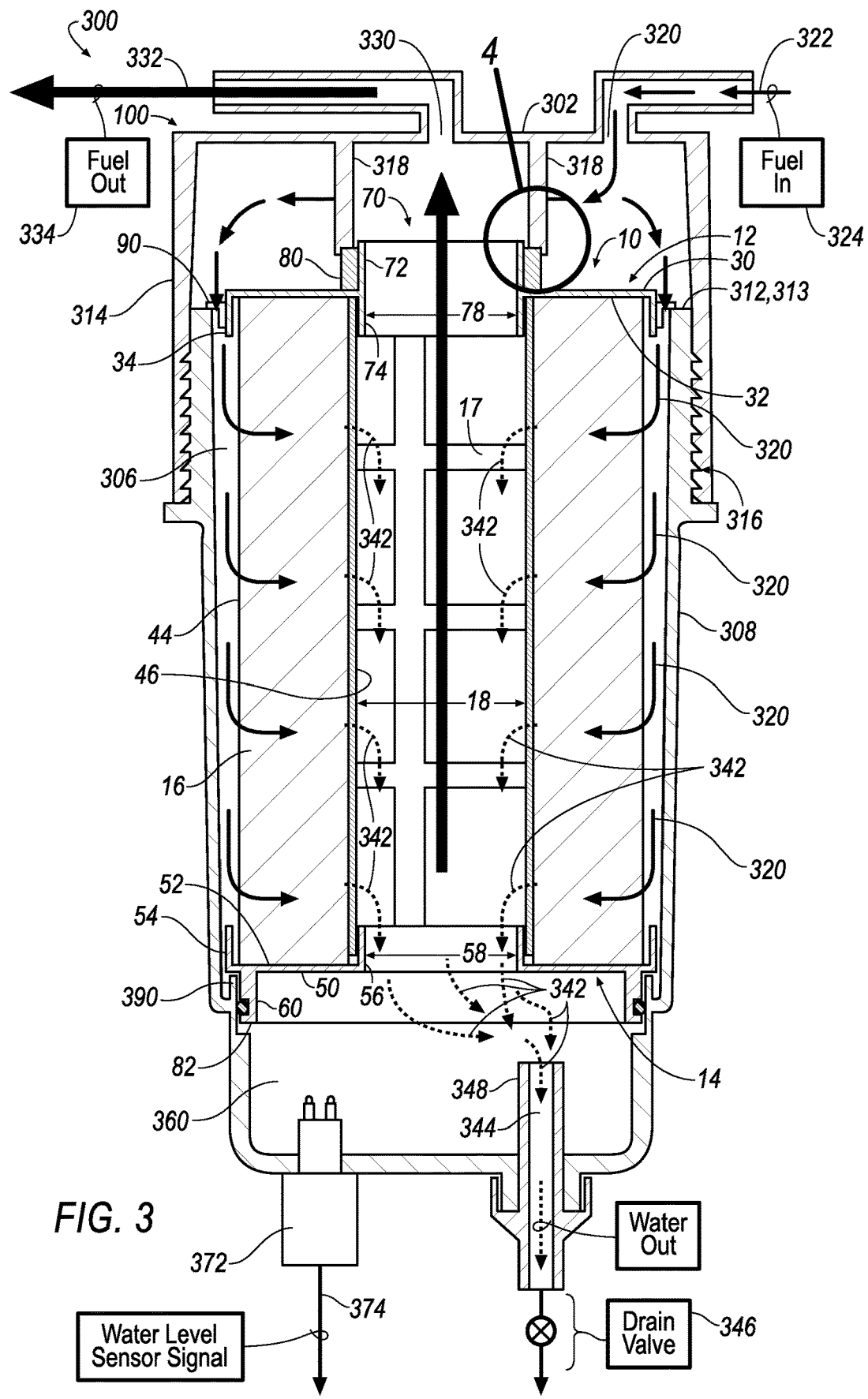
FIG. 3 is a schematic cross-sectional view of the filter assembly of FIG. 1 showing flow paths of unfiltered fuel, filtered fuel, and coalesced fluid.

Referring to FIGS. 1-3, in some implementations, a filter assembly 300 includes a filter housing 100 and a filter element 10 cooperating to remove particulates and separate fluid from a fuel stream in a fuel system. For example, the filter assembly 300 may be located downstream, on a pressure side a of a fuel supply 324 (e.g., a pump and/or fuel tank) for moving fuel through the system, e.g., from the fuel tank to an engine 334.

The filter housing 100 (hereinafter 'housing') defines an internal chamber 306 between a first end 302 and a second end 304, and the filter element 10 is received within the internal chamber 306. The housing 100 may include a cylindrical canister 308 having a bottom, closed end 310 associated with the second end 304 of the housing 100, and a top, open end 312 defining a circumferential ledge 313. A cover 314 may enclose the open end 312 of the canister 308 to define the internal chamber 306 of the housing 100. Threads 316 may be provided between the canister 308 and the cover 314 to allow the cover 314 to be releasably fastened to the canister 308. The canister 308 includes an interior wall 380 having a wide section 381 and a narrow section 382 including a smaller diameter than the wide section 381. The canister 308 may also include a sealing flange 390 that extends radially inward from the wide section 381 of the interior wall 380 to define a diameter in between the diameter of the wide section 381 and the diameter of the narrow section 382. In some implementations, the sealing flange 390 includes a U-shaped cross-section disposed radially in between the wide section 381 and the narrow section 382 that extends axially upward to overlap a portion of the wide section 381. The sealing flange 390 is operative to cooperate with the filter element 10 to separate the internal chamber 306 defined at least in part by the wide section 381 of the interior wall 380 and a reservoir 360 defined at least in part by the narrow section 382 of the interior wall 380 that opposes the closed end 310 of the canister 308.

The filter element 10 includes a first end cap 12, a second end cap 14 opposing the first end cap 12, and a ring of filter media 16 disposed between the first end cap 12 and the second end cap 14 and circumscribing a central cavity 18. In the views of FIGS. 1-3, the first end cap 12 is associated with the top end cap affixing to a top end (first end) of the filter media 16 and the second end cap 14 is associated with the bottom end cap affixing to a bottom end (second end) of the filter media 16 disposed on an opposite side of the filter media 16 than the top end. The filter media 16 may be formed from one or more materials having an efficiency and structure suitable for the particular application. For instance, the filter media 16 may coalesce fluid (e.g., water) and remove particulates from unfiltered fuel 322 (FIG. 3) that passes radially inward through the filter media 16.

In some examples, the first end cap 12 includes a first outer surface 30 and a first inner surface 32 disposed on an opposite side of the end cap 12 than the outer surface 30. The first end cap 12 defines an integral cylindrical collar 70 that circumscribes a central opening 78 in fluid communication with the central cavity 18. The cylindrical collar 70 may include a first portion 72 that extends axially upward/outward from the outer surface 30 and toward the first end 302 of the housing 100. The cylindrical collar 70 may also include a second portion 74 that extends axially downward/inward from the inner surface 32 and into the central cavity 18. The outer surface 30 is substantially planar and extends radially outward from the cylindrical collar 70 to an outer peripheral edge of the end cap 12. As used herein, the term "substantially planar" refers to the outer surface 30 being a flat surface with no slots, grooves, openings, or other features formed therein, and with no features protruding therefrom. The first end cap 12 may include a first outer peripheral wall 34 extending axially from the outer peripheral edge of the end cap 12. In some implementations, the inner surface 32 of the first end cap 12 affixes to the top end of the filter media 16 between the first outer peripheral wall 34 and the second portion 74 of the cylindrical collar 70. The inner surface 32 may affix and sealingly bond to the filter media 16 using potting compounds, such as Plastisol, urethanes, or other suitable adhesives. The first outer peripheral wall 34 extends axially downward or away from the first end cap 12 and toward the second end cap 14 to outwardly bound an outer periphery 44 of the filter media 16. Similarly, the second portion 74 of the cylindrical collar 70 may extend axially downward/inward or away from the first end cap 12 toward the second end cap 14 to inwardly bound an inner periphery 46 of the filter media 16.

In some implementations, an annular seal 80 is removably disposed upon the outer surface 30 of the first end cap and around the cylindrical collar 70. For example, the annular seal 80 includes an inner wall 83 (FIG. 2) in opposed contact with a peripheral surface of the first portion 72 of the cylindrical collar 70 while a bottom surface 81 (FIG. 2) of the annular seal 80 is disposed upon the outer surface 30 of the first end cap 12. The inner wall 83 of the annular seal 80 may include a diameter configured to accommodate the first portion 72 of the cylindrical collar 70.

In some configurations, the cover 314 of the housing 100 includes a cylindrical sleeve 318 that extends axially from the first end 302 of the housing 100 and into contact with the annular seal 80 when the cover 314 encloses the open end 312 of the canister 308 and the filter element 10 is received within the internal chamber 306. The sleeve 318 and the collar 70 are coaxially aligned such that the sleeve 318 receives the collar 70 to form a fuel outlet passage 317 in fluid communication with the central cavity 18 when the cover 314 fastens to the canister 308. The fuel outlet passage 317 is configured to direct filtered fuel 332 from within the central cavity 18 out of the filter assembly 300. Here, the annular seal 80 provides a fluid tight seal between the collar 70 and the sleeve 318 to fluidly separate the outer surface 30 of the first end cap 12 from the central cavity 18 and the fuel outlet passage 317. For instance, as the cover 314 fastens to the canister 308, the continued threaded engagement of the threads 316 causes the cylindrical sleeve 318 to compress the annular seal 80. In some examples, an axial length of the annular seal 80 is less than an axial length of the first portion 72 of the cylindrical collar 70 to permit the cylindrical sleeve 318 to axially overlap an exposed section of the first portion 72 that is received by the sleeve 318.

In some implementations, the first end cap 12 also includes a plurality of tabs 90 circumferentially arranged around the outer peripheral wall 34. Each tab 90 may extend only in a radially outward direction away from the outer peripheral edge of the first end cap 12. The tabs 90 are configured to engage the circumferential ledge 313 at the open end 312 of the canister 308 to support and properly align the filter element 10 within the internal chamber 306. Accordingly, the cylindrical collar 70 and the cylindrical sleeve 318 may be properly aligned to form and seal the fluid outlet passage 317 while the annular seal compresses. Moreover, each adjacent pair of tabs 90 defines an associated unfiltered fuel space configured to direct unfiltered fuel 322 flowing onto the outer surface 30 of the first end cap 12 to pass between the outer peripheral edge of the first end cap 12 and the interior wall 380 of the canister 308 to the outer periphery 44 of the filter media 16 for filtering. Thus, the fluid tight seal provided by the annular seal 80 fluidly separates the unfiltered fuel 322 flowing onto the first end cap 12 from the filtered fuel 332 flowing out of the filter element 10 through the fuel outlet passage 317.

In some examples, the second end cap 14 may include an outer surface 50 and an opposing inner surface 52. The second end cap 14 may include an outer peripheral wall 54 and an inner peripheral wall 56 disposed radially inward from the second outer peripheral wall 54 and defining a second central opening 58 formed through the second end cap 14. The second central opening 58 is in fluid communication with the central cavity 18. In some implementations, the inner surface 52 of the second end cap 14 affixes to the bottom end of the filter media 16 between the second outer peripheral wall 54 and the inner peripheral wall 56 on an opposite side of the filter media 16 than the first end cap 12. The inner surface 52 may affix and sealingly bond to the filter media 16 using potting compounds, such as Plastisol, urethanes, or other suitable adhesives. The second outer peripheral wall 54 extends axially upward/inward or away from the second end cap 14 toward the first end cap 12 to outwardly bound the outer periphery 44 of the filter media 16. Similarly, the inner peripheral wall 56 may extend axially upward/inward or away from the second end cap 14 toward the first end cap 12 to inwardly bound the inner periphery 46 of the filter media 16.

The second end cap 14 may also include an annular flange 60 extending axially downward/outward or away from the outer surface 50. The annular flange 60 may be disposed radially inward from the second outer peripheral wall 54 and radially outward from the inner peripheral wall 56. When the filter element 10 is received within the internal chamber 306 such that the circumferential tabs 90 of the first end cap 12 are engaged with the circumferential ledge 313 of the canister 308, the annular flange 60 axially extends downward or away from the second end cap 14 toward the second end 304 of the housing 100 and opposes the sealing flange 390. In some examples, the annular flange 60 includes an outer surface opposing the sealing flange 390 and configured to removably retain an outer seal 82 (e.g., O-ring). Here, the outer seal 82 may engage the sealing flange 390 of the interior wall 380, 381 to provide a fluid tight radial seal configuration between the canister 308 and the filter element 10 that fluidly separates the internal chamber 306 from the reservoir 360.

Referring to FIG. 2, an exploded view of the filter element 10 of FIG. 1 shows the outer surface of the annular flange 60 of the second end cap 14 defining a circumferential groove 61 formed therethrough to retain the outer seal 82. The outer seal 82 projects radially outward from the outer surface of the annular flange 60 while the circumferential groove 61 retains the outer seal 82. Moreover, the sealing flange 390 of the interior wall 380 of the canister 308 may define a circumferential slot 392 formed therethrough and configured to receive the exposed portion of the outer seal 82 when the filter element 10 is received within the internal chamber 306. Both the annular seal 80 disposed upon the outer surface 30 around the collar 70 of the first end cap 12 and the outer seal 82 may be resilient members, such as O-Rings, to form seals when compressed. In some implementations, the filter element 10 optionally includes a support core 17 configured to support the filter media 16 at the inner periphery 46. The support core 17 may extend axially along the entire length of the filter media 16 and define a plurality of passages configured to allow filtered fuel and separated fluid (e.g., water) to flow into the central cavity 18 after passing through the filter media 16. The second portion 74 of the cylindrical collar 70 extending axially into the central cavity 18 may be disposed radially inward from the support core 17.

Referring to FIG. 3, in some implementations, the cover 314 defines one or more inlet fuel ports 320 to direct unfiltered fuel 322 from the fuel supply 324 into the internal chamber 306 of the housing 100 to be filtered. For example, the unfiltered fuel 322 is received by the internal chamber 306 of the housing 100 through the one or more inlet ports 320 and the unfiltered fuel 322 may flow through the spaces defined between the tabs 90 to pass through the filter media 16 at the outer periphery 44 and exit the inner periphery 46 as filtered fuel 332 within the central cavity 18. The cover 314 may also define one or more outlet fuel ports 330 to direct filtered fuel 332 from the filter element 10 out of the housing 100 and to the engine 334 downstream of the filter assembly 300. For example, filtered fuel 332 exiting the filter media 16 at the inner periphery 46 within the central cavity 18 flows through the fuel outlet passage 317 and out of the filter assembly 300 via the outlet fuel port 330. In some examples, the support core 17 is disposed within the central cavity 18 and supports the inner periphery 46 of the filter media 16. The support core 17 may be formed from cross-members defining a plurality of passages configured to allow the filtered fuel 332 to flow into the central cavity 18 and exit the filter assembly 300 through the outlet port 330 after passing through the filter media 16.

In some implementations, the filter media 16 also coalesces water 342 (and/or one or more other fluids) from the unfiltered fuel 322 passing through the filter media 16 at the outer periphery 44 and exiting at the inner periphery 46 within the central cavity 18. Droplets of the water 342 within the central cavity 18 may drain out of the filter element 10 through the second central opening 58 of the second end cap 14 and into the reservoir 360. The water 342 contained within the reservoir 360 may drain out of the housing 100 and the filter assembly 300 through one or more drain ports 340 (FIGS. 1 and 2) defined by the canister 308. In some examples, a drain member 348 extends through the drain port 340 and defines a drain passage 344 in fluid communication with the reservoir 360 for draining the water 342 out of the housing 100. A drain valve 346 may be disposed within the drain passage 344 to selectively drain the water 342 out of the reservoir 360 via the drain passage 344. In some implementations, a water drain sensor 372 is disposed within the reservoir 360 and is configured to transmit a water drain signal 374 to notify an operator to drain the water 342 when the reservoir 360 becomes full. For example, an operator may active the drain valve 346 to drain the water 342 through the drain passage 344 in response to receiving the water drain signal 374. Additionally or alternatively, the drain valve 346 may be in communication with the water drain sensor 372 to drain the water 342 through the drain passage 344 in response to receiving the water drain signal 374.

Figure 4:
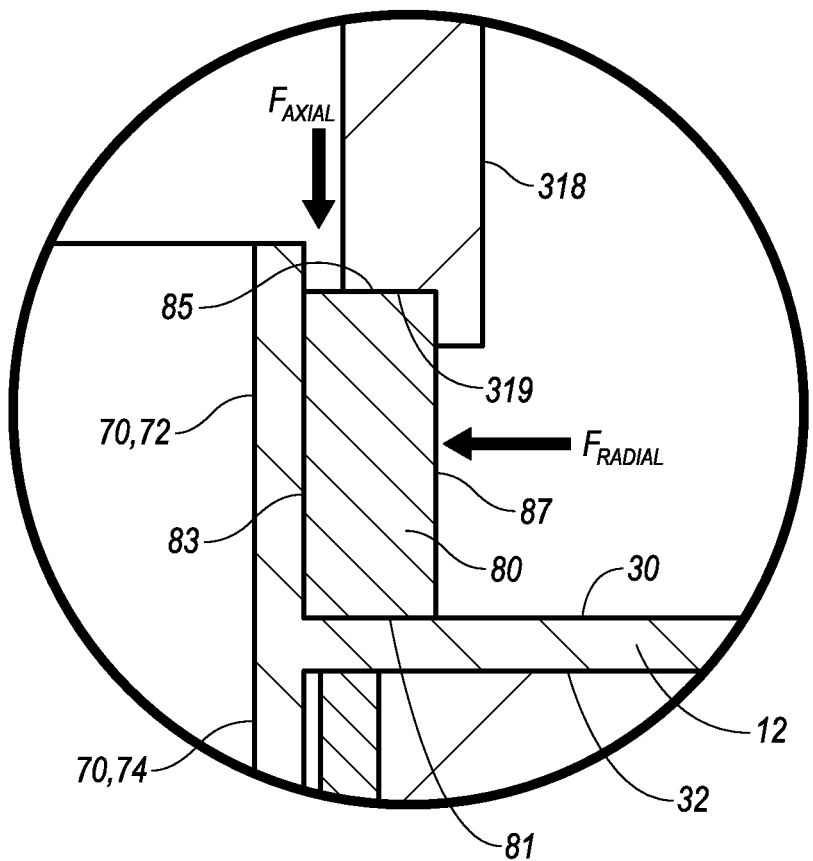
FIG. 4 is a detailed schematic view enclosed within area 4 of FIG. 3 showing a cylindrical sleeve of the filter housing applying an axial compressive force and a radial compressive force upon the annular seal.

Referring to FIG. 4, a detailed view within area 4 of FIG. 3 shows the cylindrical sleeve 318 disposed radially outward from the cylindrical collar 70 of the filter element 10 and engaging the annular seal 80 disposed around the first portion 72 of the cylindrical collar 70. The cylindrical sleeve 318 may define an elbow section 319 that allows the sleeve 318 to engage with both a top surface 85 and an outer wall 87 of the annular seal 80 when the cover 314 fastens to the canister 308. In doing so, the sleeve 318 may cooperate with the collar 70 to provide a radial compressive force ($F_{Radical}$) upon the annular seal 80. Additionally, the sleeve 318 may cooperate with the first end cap 12 to provide an axial compressive force ($F_{Axial}$) upon the annular seal 80.

Figure 5:
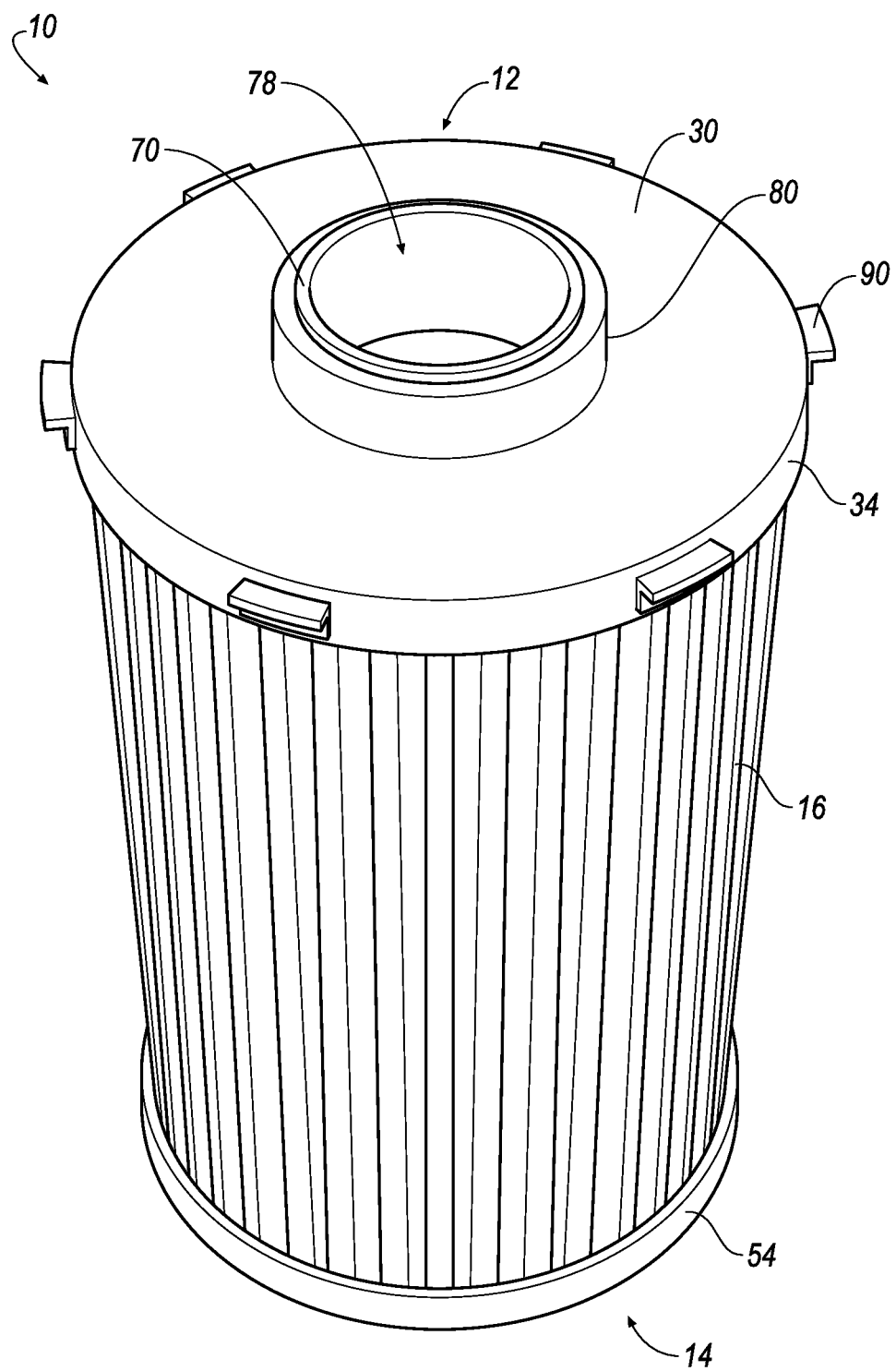
FIG. 5 is a top perspective view of the filter element of FIG. 1 showing the annular seal disposed around the cylindrical collar and upon an outer surface of the top end cap.

FIG. 5 provides a top perspective view of the filter element 10 of FIGS. 1-4. The first end cap 12 (e.g., the top end cap relative to the views of FIGS. 1-4) includes the cylindrical collar 70 projecting axially upward from the outer surface 30 and the annular seal 80 disposed around the collar 70 upon the outer surface 30. The example shows the axial length of the annular seal 80 being less than the axial length of cylindrical collar 70. The outer surface 30 is substantially planar and extends radially outward from the collar 70 to the outer peripheral edge from which the outer peripheral wall 34 extends axially downward or toward the filter media 16. FIG. 5 also shows the plurality of tabs 90 circumferentially arranged around the outer peripheral wall 34 of the first end cap 12 such that each tab 90 extends only in the radially outward direction away from the peripheral edge of the first end cap 12.

A number of implementations have been described. Nevertheless, it will be understood that various modifications may be made without departing from the spirit and scope of the disclosure. Accordingly, other implementations are within the scope of the following claims. compressible

What is claimed is:

1. A filter element comprising:
a first end cap including a substantially planar first outer surface,
a cylindrical collar that circumscribes a first central opening, and a plurality of tabs, the first outer surface extending radially outward from the cylindrical collar to an outer peripheral edge, the cylindrical collar including a first portion extending axially outward from the first outer surface by a first length, the plurality of tabs circumferentially arranged around the outer peripheral edge;
wherein the first end cap further includes an outer peripheral wall extending axially from the outer peripheral edge, and wherein each tab of the plurality of tabs includes a first portion extending along the outer peripheral wall and a second portion extending radially away from the outer peripheral wall;
a second end cap defining a second central opening substantially coaxial with the first central opening;
a ring of filter media disposed between the first end cap and the second end cap, the ring of filter media circumscribing a central cavity in fluid communication with the first central opening and the second central opening; and an annular seal disposed upon the first outer surface and around the first portion, the annular seal extending axially away from the first outer surface by a second length that is less than the first length, wherein the annular seal is configured to be radially and axially compressed by a cylindrical sleeve.

2. The filter element of claim 1, wherein the cylindrical collar includes a second portion that extends axially inward from the first end cap and into the central cavity.

3. The filter element of claim 1, wherein the plurality of tabs define a plurality of unfiltered fuel spaces, each unfiltered fuel space defined between an adjacent pair of the tabs and configured to direct unfiltered fuel flowing onto the first outer surface of the first end cap to an outer periphery of the filter media for filtering.

4. The filter element of claim 1, wherein the second end cap includes an annular flange extending axially outward from second end cap, the annular flange configured to receive an outer seal at an outer surface of the annular flange.

5. The filter element of claim 4, wherein the outer surface of the annular flange includes a circumferential sealing groove formed therethrough that retains the outer seal.

6. The filter element of claim 1, wherein the filter media is configured to separate both fluid and particulates from unfiltered fuel as the unfiltered fuel flows radially inward through the filter media, the fluid separated by the filter media drains out of the filter element through the second central opening of the second end cap while fuel filtered by the filter media flows out of the filter element through the first central opening of the first end cap.

7. The filter element of claim 1, further comprising:
a support core disposed in the central cavity of the filter media and supporting an inner periphery of the filter media, wherein the cylindrical collar is disposed radially inward from the support core.

8. A filter assembly comprising:
a filter housing defining an internal chamber between a first end and a second end, the first end including a cylindrical sleeve;
wherein the filter housing includes a canister including an interior wall and a sealing flange, the interior wall having a wide section and a narrow section, the sealing flange having a first portion that extends radially inward from the wide section and a second portion that extends axially upward to overlap a portion of the wide section, and wherein the second portion opposes the outer surface of the annular flange of the second end cap; and
a filter element disposed within the internal chamber of the filter housing, the filter element comprising:
a first end cap opposing the first end of the filter housing, the first end cap including:
a substantially planar first outer surface; and
a cylindrical collar circumscribing a first central opening, the first outer surface extending radially outward from the cylindrical collar to an outer peripheral edge of the first end cap, the cylindrical collar extending axially outward from the first outer surface by a first length;
an annular seal disposed upon the first outer surface of the first end cap and around the cylindrical collar, the annular seal including an axially-extending outer wall and a radially-extending top surface, the annular seal extending axially away from the first outer surface by a second length that is less than the first length, the top surface disposed radially inwardly of the outer wall;
a second end cap opposing the second end of the filter housing and defining a second central opening substantially coaxial with the first central opening; and
a ring of filter media axially extending between the first end cap and the second end cap, the filter media circumscribing a central cavity in fluid communication with the first central opening and the second central opening, wherein the cylindrical sleeve (i) axially overlaps the cylindrical collar and (ii) engages the outer wall and the top surface to radially and axially compress the annular seal.

9. The filter assembly of claim 8, wherein the cylindrical sleeve extends away from the first end of the filter housing and into contact with the annular seal, the cylindrical sleeve receiving the cylindrical collar to form a fuel outlet passage in fluid communication with the central cavity to direct fuel filtered by the filter media out of the filter element.

10. The filter assembly of claim 9, wherein the annular seal provides a fluid tight seal between the cylindrical collar and the cylindrical sleeve to fluidly separate the outer surface of the first end cap from the central cavity and the fuel outlet passage.

11. The filter assembly of claim 9, wherein the annular seal is radially compressed between the cylindrical collar and the cylindrical sleeve and axially compressed between the cylindrical sleeve and the first end cap.

12. The filter assembly of claim 8, further comprising a plurality of tabs circumferentially arranged around the outer peripheral edge of the first end cap and extending only in a radially outward direction away from the outer peripheral edge of the first end cap, each tab configured to engage a circumferential ledge of the filter housing within the internal chamber.

13. The filter assembly of claim 12, wherein each adjacent pair of the tabs define an associated unfiltered fuel space configured to direct unfiltered fuel flowing onto the first outer surface of the first end cap to an outer periphery of the filter media for filtering.

14. The filter assembly of claim 8, wherein the second end cap includes an annular flange extending axially away from the second end cap and toward the second end of the filter housing, the annular flange having an outer surface configured to retain an outer seal.

15. The filter assembly of claim 14, wherein the outer seal engages an interior wall of the filter housing to provide a fluid tight seal between a reservoir defined by the filter housing at the second end and unfiltered fuel flowing within the internal chamber between an outer periphery of the filter media and the interior wall of the filter housing, the reservoir in fluid communication with the second central opening of the second end cap.

16. The filter assembly of claim 15, wherein the unfiltered fuel passes through the filter media at the outer periphery and exits an inner periphery of the filter media as filtered fuel and fluid droplets coalesced from the filtered fuel by the filter media, the fluid droplets drain out of the filter media through the second central opening of the second end cap and the filtered fuel flows out of the filter element through the first central opening of the first end cap.

17. The filter element of claim 1, wherein a central axis of the filter media extends through the first central opening and the second central opening.

18. The filter assembly of claim 8, wherein a central axis of the filter media extends through the first central opening and the second central opening.

* * * * *